Jan. 21, 1941.                S. A. HANSEN                2,229,207
REINFORCEMENT FOR TUBULAR RADIATORS
Filed Dec. 23, 1938
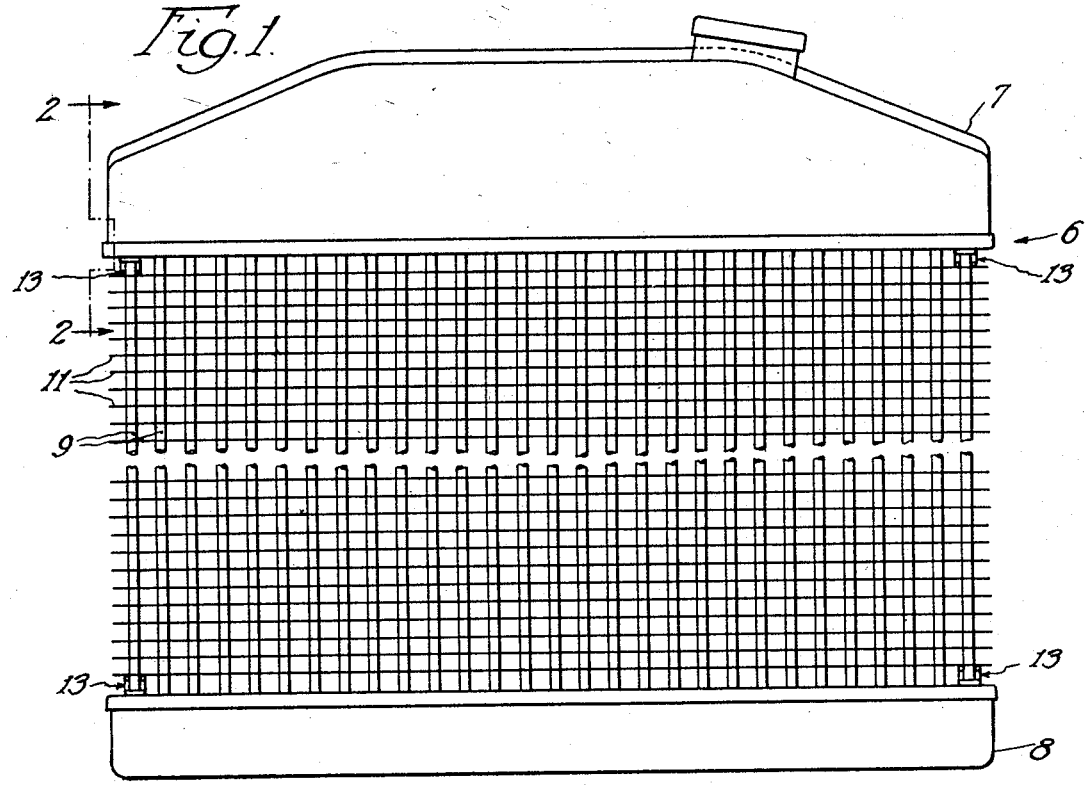
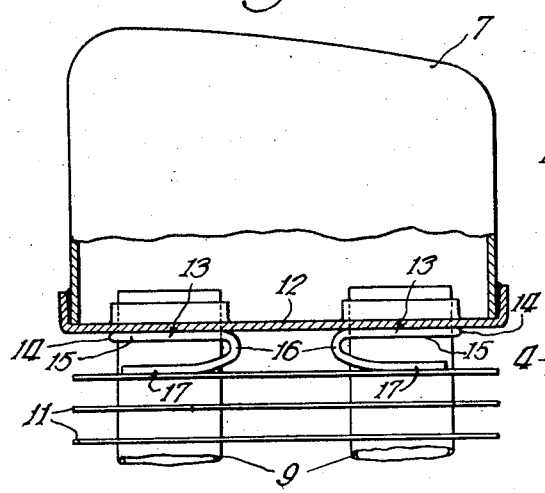
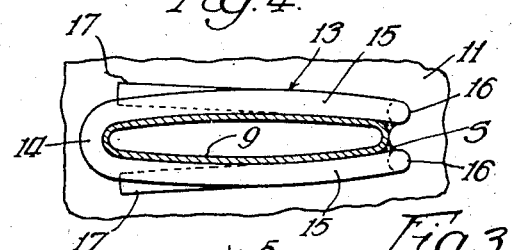
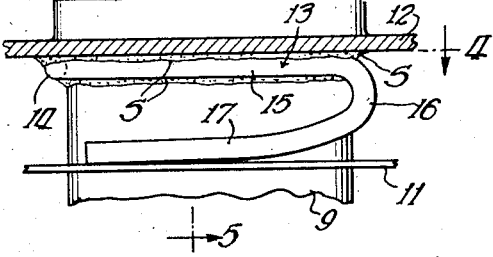
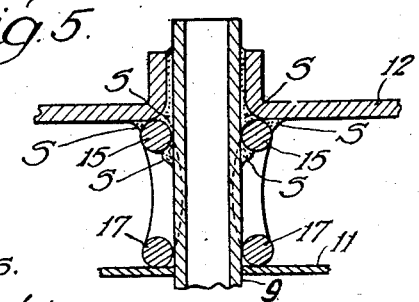
Inventor
Severt Axel Hansen
By Hill & Hill, Attys
Witness.
V. Siljander Patented Jan. 21, 1941

2,229,207

UNITED STATES PATENT OFFICE 2,229,207

REINFORCEMENT FOR TUBULAR RADIATORS

Severt Axel Hansen, Racine, Wis., assignor to Modine Manufacturing Company, Racine, Wis., a corporation of Wisconsin Application December 23, 1938, Serial No. 247,365

11 Claims. (Cl. 257—125)

This invention relates to improvements in radiators and reinforcing means therefor, and particularly to means for reinforcing a radiator structure or heat exchange device adjacent the juncture of certain of the tubes and header plates forming parts of the radiator construction.

It is well known that radiators or heat exchange device of the character employed in motor vehicle construction are frequently subjected to wrenching or tortion strains tending to rupture the soldered joints at the juncture of the tubes and header plates to which the tubes are connected, particularly, adjacent the end portions of the headers, thus causing leaks and loss of the radiator fluid.

One object of the present invention, therefore, is to provide a novel construction and arrangement wherein reinforcing means are provided adjacent the juncture of said tubes and headers to strengthen the joint and resist the tortional strains exerted thereon.

Another object of the invention is to provide novel means for retaining the reinforcing member in proper position with respect to the tubes and headers.

Another object of the invention is to provide a reinforcing member having means associated therewith and cooperable with a fin, forming part of the radiator construction, for retaining the member in desired position adjacent the header.

Another object of the invention is to provide a reinforcing member of suitably resilient material so treated as to assist in the fusion of the solder adjacent the tube and header joint to provide a strong, substantial and efficient connection.

A further object of the invention is to provide a reinforcing member which is of simple construction, economical to manufacture and efficient in its operation.

A still further object of the invention is to improve devices of the character described in sundry details hereinafter referred to and particularly pointed out in the appended claims.

One embodiment of the present invention is shown for illustrative purposes in the accompanying drawing, in which:

Fig. 1 is a front elevational view of a radiator structure illustrating an embodiment of my improved reinforcing means in connection therewith;

Fig. 2 is an enlarged end elevational view, partly in section, of a portion of the structure illustrated in Fig. 1, and taken substantially as indicated by the line 2—2 thereof;

Fig. 3 is a further enlarged elevational view of a portion of the structure illustrated in Fig. 2;

Fig. 4 is a plan sectional view taken substantially as indicated by the line 4—4 of Fig. 3; and Fig. 5 is a further enlarged fragmentary sectional elevational view taken substantially as indicated by the line 5—5 of Fig. 3.

The illustrative embodiment of the present invention, as shown in the drawing, contemplates the use of a radiator structure indicated, as a whole, by the numeral 6, and comprising spaced upper and lower headers 7 and 8, respectively, connected by a plurality of fluid conducting tubes 9 having spaced fins 11 mounted thereon between said headers, the tubes 9 being shown, in the present instance, as of flattened elongated cross section, and adapted to extend through header plates 12 and into the respective headers 7 and 8 for establishing communication therebetween, as clearly illustrated in Figs. 2, 3, and 5.

As previously mentioned, radiators of the character described, particularly when employed in motor vehicles or the like, are subjected to torsional strains and stresses tending to disrupt the soldered joints connecting the tubes 9 and header plates 12 of the headers 7 and 8, particularly adjacent the outer or end portions of the headers, and to overcome this condition, the joints of, preferably, the outermost tubes of the radiator structure are provided with reinforcing members indicated, as a whole, and respectively, by the numeral 13, and positioned, preferably, on the tubes of the radiator, as illustrated in Figs. 1 and 2, wherein the reinforcing members are applied to the opposite ends of the outermost tubes, as illustrated in Fig. 1, and to the rear and foremost tubes, as illustrated in Fig. 2, and adjacent the respective headers 7 and 8.

In the illustrative embodiment, and as more clearly illustrated in Figs. 2 to 5, inclusive, the reinforcing member is formed, preferably, of flexible resilient wire-like material bent upon itself, as indicated at 14, to form a U-shaped body portion comprising a pair of leg portions 15 positioned in a common plane and, in the present instance, bowed outwardly in opposite directions to form an arcuate inner surface adapted, in the present instance, to conform to the slightly curved flattened side portions of the tubes, as clearly illustrated in Fig. 4, the free ends of the leg portions 15 being bent upon themselves, as indicated at 16, to provide a pair of resilient fingers 17 at opposite sides of the tube and adapted to extend substantially in the direction of the respective leg portions at one side of the plane thereof and in spaced relation with respect thereto, as clearly illustrated in Figs. 2, 3, 4, and 5.

The reinforcing members 13 of the present invention, preferably, are coated with a fusible bonding material, such, for example, as tin or solder containing, preferably, not less than twenty per cent tin, and are adapted to be inserted between the header plates 12 and an adjacent fin 11 of the radiator structure in a manner to position the leg portions 15 of the reinforcing member closely adjacent the header plate 12 at its juncture with the tubes 9, the resiliency of the leg portions 15 being of such a character as to enable the positioning of the leg portions closely adjacent the sides of the tubes in a manner to surround a substantial portion thereof, while the fingers 17 are adapted to engage an adjacent fin 11, or the like, and by reason of the resiliency of the fingers 17, to exert a force tending to urge the leg portions 15 into contact with the adjacent surface of the header plates and retain the reinforcing members 13 in desired position.

In the manufacture of radiators of the character described, the tubes and fins are usually coated with a fusible material, and after the reinforcing members 13 have been positioned on the radiator in the manner above described, the entire radiator structure is subjected to a heat treatment of a temperature sufficient to fuse the coating on the tubes 9, fins 11 and reinforcing members 13 in a manner to flow the bonding material into the interstices adjacent the headers, tubes, and reinforcing members as illustrated at S in Figs. 3 and 5, in a manner to form a most efficient bond between the adjacent portions of the radiator parts, as shown in Figs. 3 and 5 of the drawing.

It will be observed from the foregoing description that the present invention provides a strong, sturdy and efficient connection between the tubes 9 and headers 12 at points subjected to the greatest tortional strains in the use of radiators of the character described, and that by reason of the positioning of the leg portions 15 of the reinforcing means closely adjacent the juncture of the tubes 9 and header plates 12, a most efficient, strong and strain-resisting joint is provided.

Obviously, the present invention is not limited to the precise construction and arrangement shown and described as the same may be variously modified. Moreover, all the features of the invention need not be used conjointly as the same may be used to advantage in variously different combinations and sub-combinations.

What I claim as new and desire to secure by Letters Patent is:

1. In a radiator comprising a pair of spaced headers, a plurality of fluid conducting tubes positioned between and communicating with said headers, and a plurality of fins mounted on said tubes, the combination of a plurality of wire-like reinforcing members adjacent the junctures of certain of said tubes and headers, and means forming a part of said members engageable with certain of said fins for retaining the members in position adjacent said headers.

2. In a radiator comprising a pair of spaced headers, a plurality of fluid conducting tubes positioned between and communicating with said headers, and a plurality of fins mounted on said tubes, the combination of a plurality of reinforcing members overlying the juncture of certain of said tubes and headers, and resilient means forming a part of said members engageable with an adjacent fin for retaining the members in position adjacent said headers.

3. In a radiator comprising a pair of spaced headers, a plurality of fluid conducting tubes positioned between and communicating with said headers, and a plurality of fins mounted on said tubes, the combination of a plurality of reinforcing members overlying the junctures of certain of said tubes and headers, and resilient means formed integrally with said members and engageable with an adjacent fin for retaining the members in close proximity to and adjacent said headers.

4. In a radiator comprising a pair of spaced headers, a plurality of fluid conducting tubes positioned between and communicating with said headers, and a plurality of fins mounted on and spaced longitudinally of said tubes, the combination of a plurality of reinforcing members adjacent the juncture of certain of said tubes and headers, and resilient fingers formed integrally with said said members at the respective opposite sides of said tubes and engageable with an adjacent fin for retaining the members in close proximity to and adjacent said headers, and a bonding material in the interstices formed by said members, tubes and headers.

5. In a radiator comprising a pair of spaced headers, a plurality of flattened fluid conducting tubes positioned between and communicating with said headers, and a plurality of fins mounted on and spaced longitudinally of said tubes, the combination of a plurality of substantially U-shaped reinforcing members having leg portions positioned closely adjacent certain of said tubes and said headers and adapted to conform substantially to the outer contour of said tubes, and a plurality of fingers operatively connected to the free ends of said leg portions and adapted to engage an adjacent fin for maintaining said members in juxtaposition with respect to said headers.

6. In a radiator comprising a pair of spaced headers, a plurality of flattened fluid conducting tubes positioned between and communicating with said headers, and a plurality of fins mounted on and spaced longitudinally of said tubes, the combination of a plurality of elongated substantially U-shaped reinforcing members of resilient material having leg portions positioned closely adjacent certain of said tubes and said headers and adapted to conform substantially to the outer contour of said tubes, a plurality of fingers formed integrally with and extending from the free ends of said leg portions in spaced relation thereto at opposite sides of the tube and adapted to engage an adjacent fin for maintaining the U-shaped portion of said members in juxtaposition with respect to said headers, and a bonding material in the interstices formed by said members, tubes and headers.

7. In a radiator comprising a pair of spaced headers, a plurality of flattened fluid conducting tubes positioned between and communicating with said headers, and a plurality of fins mounted on and spaced longitudinally of said tubes between said headers, the combination of a plurality of elongated substantially U-shaped reinforcing members of resilient material having leg portions positioned closely adjacent certain of said tubes and said headers and adapted to conform substantially to the outer contour of the sides and an edge portion of said certain tubes in a manner to surround a substantial portion thereof, a plurality of resilient fingers formed integrally with and extending from the free ends of said leg portions in spaced relation thereto at opposite sides of the tube and adapted to engage an adjacent fin for maintaining the U-shaped portion of said members in juxtaposition with respect to said headers, and a fusible bonding material in the interstices formed by said members, tubes, and headers.

8. A reinforcing member for radiators having a header and tubular fluid conducting members operatively connected thereto, said reinforcing member being formed of metallic, resilient wire-like material bent upon itself to form a substantially U-shaped body portion having a pair of leg portions adapted to be positioned at opposite sides of a fluid conducting tube adjacent and outside its juncture with the header of a radiator.

9. A reinforcing member of flexible wire-like material bent upon itself to form a substantially U-shaped body portion having a pair of leg portions positioned in a common plane, and a pair of fingers bent back upon the respective leg portions from adjacent the free ends thereof and adapted to extend substantially in the direction of the respective leg portions at one side of the plane thereof and in spaced relation with respect thereto.

10. A reinforcing member of resilient wire-like material having a coating of fusible bonding material thereon and bent upon itself to form a substantially U-shaped body portion having a pair of oppositely bowed leg portions positioned in a common plane, and a pair of resilient fingers bent back upon the respective leg portions from adjacent the free ends thereof and adapted to extend substantially in the direction of the respective leg portions at one side of the plane thereof and in spaced relation with respect thereto.

11. In a radiator comprising a plurality of headers and a plurality of fluid conducting tubes positioned between and communicating with said headers, the combination of a reinforcing member open at one end for insertion over a tube from a lateral direction, opposite side portions of said member being formed to lie closely adjacent to the side of the tube over a substantial portion circumferentially of the tube and in juxtaposition to an outer surface of a header, the member having means to prevent displacement thereof longitudinally of the tube prior to bonding thereof.

SEVERT AXEL HANSEN.